United States Patent [19]

Poling

[11] Patent Number: 5,546,539

[45] Date of Patent: Aug. 13, 1996

[54] METHOD AND SYSTEM FOR UPDATING FILES OF A PLURALITY OF STORAGE DEVICES THROUGH PROPOGATION OF FILES OVER A NEWORK

[75] Inventor: William F. Poling, Beaverton, Oreg.

[73] Assignee: Intel Corporation, Santa Clara, Calif.

[21] Appl. No.: 542,039

[22] Filed: Oct. 12, 1995

Related U.S. Application Data

[63] Continuation of Ser. No. 174,836, Dec. 29, 1993, abandoned.

[51] Int. Cl.$^6$ ............................................. G06F 15/16
[52] U.S. Cl. ............................ 395/200.05; 395/200.02; 395/200.10; 395/200.11; 395/182.05; 395/600; 395/839; 364/DIG. 1; 364/284.4; 364/230.4; 364/242.74
[58] Field of Search ............................... 395/600, 200.02, 395/200.05, 200.10, 182.05, 200.11, 839; 364/DIG. 1

[56] References Cited

U.S. PATENT DOCUMENTS

| | | | |
|---|---|---|---|
| 4,891,785 | 1/1990 | Donohoo | 364/900 |
| 4,914,652 | 4/1990 | Nguyen | 370/85.5 |
| 5,019,963 | 5/1991 | Alderson et al. | 364/200 |
| 5,060,185 | 10/1991 | Naito et al. | 364/900 |
| 5,136,707 | 8/1992 | Block et al. | 395/600 |
| 5,220,657 | 7/1993 | Bly et al. | 395/425 |
| 5,230,047 | 7/1993 | Frey, Jr. et al. | 395/575 |
| 5,313,664 | 5/1994 | Sugiyama et al. | 364/405 |
| 5,388,214 | 2/1995 | Leiserson et al. | 395/200 |
| 5,418,945 | 5/1995 | Carter et al. | 395/600 |

*Primary Examiner*—Thomas G. Black
*Assistant Examiner*—Jean R. Homere
*Attorney, Agent, or Firm*—Blakely, Sokoloff, Taylor & Zafman

[57] ABSTRACT

The present invention relates to a method and apparatus for propagating a master file over a network bus to designated storage devices configured to maintain an identical copy of the master file. As a result, the copy of the master file can be stored in memory accessible to the user and/or the user's processing device while the master file is stored in memory inaccessible to the user and/or his or her processing device.

18 Claims, 7 Drawing Sheets

METHOD AND SYSTEM FOR UPDATING FILES OF A PLURALITY OF STORAGE DEVICES THROUGH PROPOGATION OF FILES OVER A NEWORK

This is a continuation of application No. 08/174,836 filed Dec. 29, 1993, now abandoned.

BACKGROUND OF THE INVENTION

1. Field of the Invention

The present invention relates to a communication scheme for sharing information between a plurality of storage devices coupled to a network, and more particularly, to a communication scheme for propagating a master file over a conventional network bus from one storage device to the same storage device or preferably another storage device.

2. Background of the Field

In the computing industry, it is quite common to transfer information such as data, addresses and commands between a processing device (e.g., workstations) and a storage device (e.g., a file server, an external memory unit, etc.). The idea of interconnecting storage devices with processing devices was principally developed in the early 1970's with the advent of networking systems ("networks"), which permitted a processing device to access other memory and computational resources beyond the immediate proximity of its mainframe. Such interconnections were accomplished by coupling the memory and computational resources to a number of processing devices through physical medium. The physical medium was commonly a conventional network bus, such as, ethernet, token ring and the like, having a plurality of transmission lines, in which the conventional network bus would act as a shared communications path for those devices connected thereto.

In most networks today, each device in the network needs to only "plug" into the network bus to be theoretically connected to each of the other devices. Typically, however, conventional networks are configured to provide users limited access to certain storage devices. In other words, a particular user could be granted permission to access all, none or a limited number of storage devices.

In view of these access limitations, the storage devices were neither designed nor arranged to share files (i.e., information electrically stored in a predetermined format), but rather, were designed to provide an authorized user access to a particular group of files stored therein. This arrangement has created a wide range of accessibility problems. For example, suppose an executable file is stored in a first storage device and a file necessary for completing the operation of the executable file is stored in a second storage device. If the user runs the executable file on his or her processing device, which has access to only the first storage device, the executable file would fail. As a result, the user would have to retrieve the necessary file from the second storage device and download it onto the first storage device. Such retrieval and downloading is a time consuming process, and occasionally, an impossible one if the second storage device is not accessible to the user and/or the user's processing device.

In addition, even if the necessary file is copied on the first storage device, there exists a substantial risk that any updated versions of the necessary file will not consistently be transferred into the first storage device. Therefore, although the above-mentioned executable file may not fail, it would likely perform at a less than optimal level. This problem normally, but not exclusively, occurs in multi-division corporations, wherein each division relies on information provided by the other divisions.

In order to alleviate this accessibility problem, several storage devices 2a–2n are typically coupled together through a network bus 1 as shown in FIG. 1. The network bus 1 enables a first storage device to "log onto" a second storage device through conventional connection protocol, thereby increasing the number of accessible files. As a result, the person using one of the plurality of processing devices 3a–3n would be able to access more information, while still being attached to a single storage device. However, networked storage devices 3a–3n experience other problems.

A primary problem experienced by networked storage devices 3a–3n is that usage dramatically increases for those files common to many application programs. Such increased usage is directly correlated with an increased probability that the common file could become corrupted through human error since more persons now have access to the common file.

A second problem experienced by networked storage devices is related to decreased system performance; namely, if a large number of users are using the common file, the operation speed of the storage device storing the common file is drastically impeded. This would have a significant impact on the productivity of those persons working with any files stored in that storage device.

Another dimension to the problem experienced by networked storage devices relates to system security. Although accessibility problems could be avoided by networking the storage devices together with no access limitations, such a network would pose major security risks. Any person having access to any one of the networked storage devices could intentionally or accidentally erase and/or corrupt files within any of the networked storage devices.

Another problem relates to cost. There are potentially large costs associated with coupling several storage devices together through the network bus, including but not limited to, reconfiguring network support software to support the new system and additional labor costs associated with the design and support of the new configuration.

BRIEF SUMMARY OF THE INVENTION

It would be desirable to create and implement a file propagation communication scheme for propagating a master file from one of the plurality of networked storage devices to another networked storage device through a conventional network bus for updating purposes. Accordingly, it is an object of the present invention to provide such an apparatus and method.

Another object of the present invention is to provide a file propagation communication scheme having minimal susceptibility of master file corruption.

Another object of the present invention is to provide a file propagation communication scheme without impeding performance of the storage devices coupled to the network bus.

A further object of the present invention is to provide a file propagation communication scheme which is cost-effective to employ and configure.

Yet another object of the present invention is to provide a file propagation communication scheme for maintaining limited access privileges currently placed on a file storage device, while still allowing a user access to files stored in inaccessible memory.

Still another object of the present invention is to provide a file propagation communication scheme for generating a copy of the master file to be used by storage devices which do not store the master file.

The present invention describes a plurality of storage devices which are arbitrarily coupled together through a conventional network bus. In addition, a plurality of processing devices are coupled to the network bus in order to provide a communication link between the storage device and the processing devices.

Unlike the conventional networks which utilize conventional connection protocol to access files for sharing purposes, the present invention propagates master files over the network bus to designated storage devices configured to maintain an identical copy of the master file. As a result, the master file which could be stored in memory inaccessible to a user and/or the user's processing device, is outputted to memory that is accessible to the user and/or his or her processing device. The process for accomplishing this propagation of the master file is clearly described in the Detailed Description section of this Application.

BRIEF DESCRIPTION OF THE DRAWINGS

The objects, features and advantages of the present invention will become apparent from the following detailed description of the present invention in which.

DETAILED DESCRIPTION OF THE INVENTION

The present invention describes a file propagation communication scheme for propagating copies of a master file from one of the plurality of storage devices to another storage device through a conventional network bus.

The detailed description which follows is presented largely in terms of operation flowcharts which are the means used by those skilled in the art to most effectively convey the substance of their work to others skilled in the art. The flowcharts illustrate a number of steps necessary to provide the file propagation communication scheme used in the system. These steps require physical manipulations of physical qualities. Usually, although not necessarily, these physical qualities take the form of electrical or magnetic signals capable of being stored, transferred and otherwise manipulated.

Additionally, throughout the following detailed description, a variety of terms are commonly used. One such term is a "master" file which denotes an original file shared in a network. The master file is capable of being updated only by a master storage device (discussed in detail below) in the network. A "clone" file, on the other hand, denotes a copy of the master file received and stored in a slave or sub-master storage device. Each storage device typically contains a number of master and clone files, although it is not required that every storage device contain both types of files.

Figure 1:
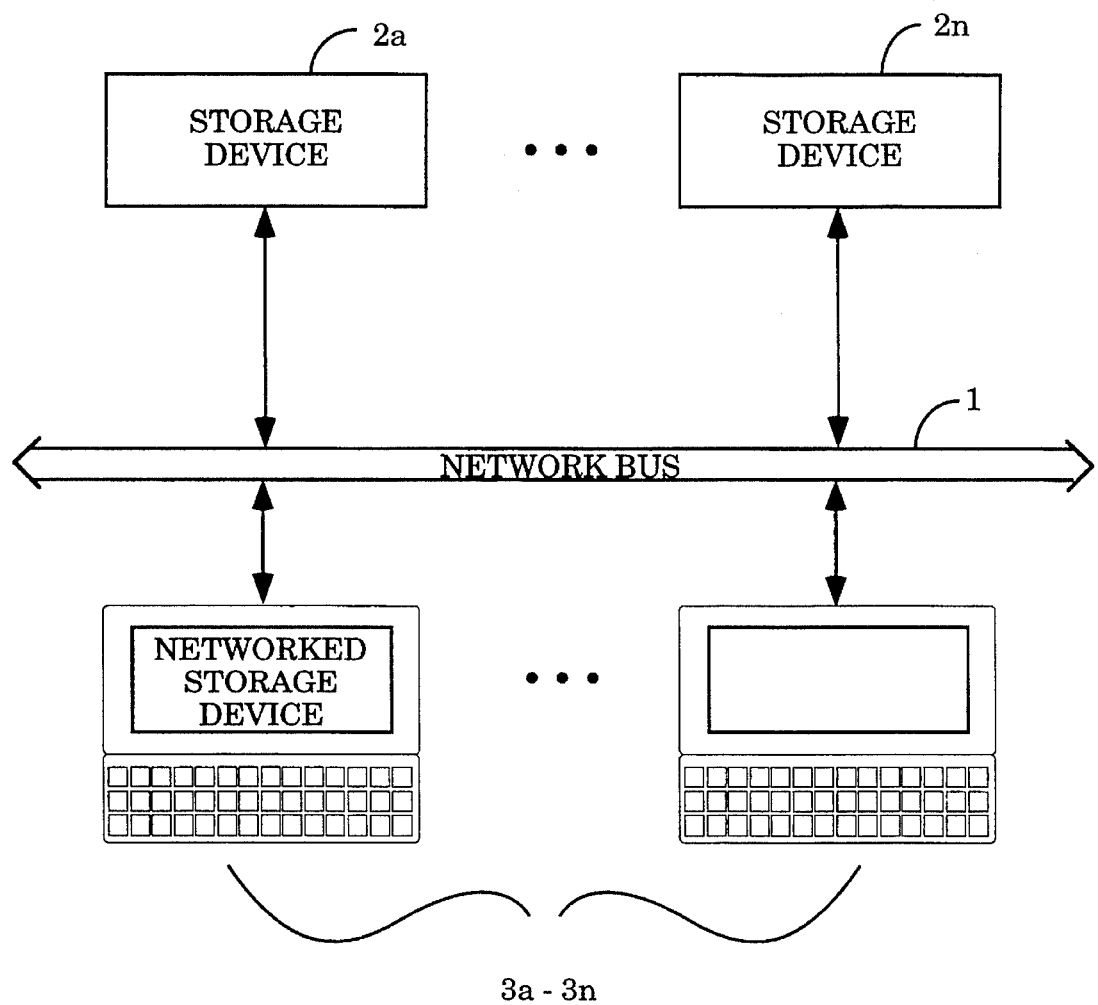
FIG. 1 is a block diagram showing a conventional network system supporting a plurality of storage devices coupled together through a network bus in order to enable a first storage device to access a file stored on a second storage device.
Figure 2A:
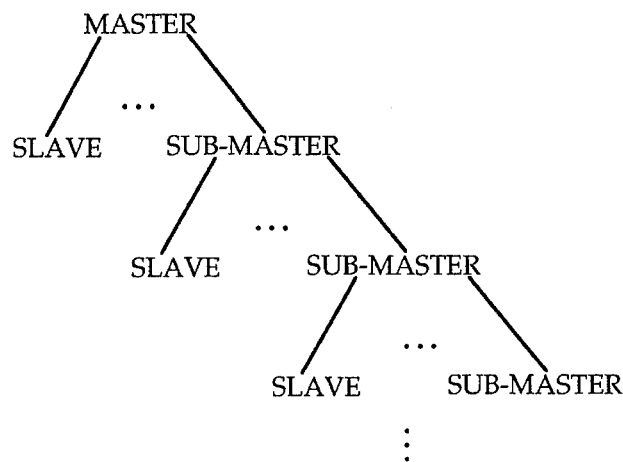
FIG. 2a illustrates possible storage device configurations with respect to any given file.

Configuration hierarchy, which can be employed in the present invention, is illustrated in FIG. 2a. With reference to each file, a storage device is designated to be one of three categories: "master", "sub-master" or "slave". The "master" storage device is the device which stores the master file. As such, it is able, if configured accordingly, to propagate the master file as well as master file status information onto the network bus, thereby allowing other storage devices to utilize the master file.

The "slave" storage device, on the other hand, is merely a receptive device having no ability to provide master file status information or propagate the master file to other storage devices.

The "sub-master" storage device is a hybrid of the master and slave storage devices. The sub-master storage device is able to dissipate copies of master file over the network to certain slave or sub-master storage devices, but is only able to provide file status information pertaining to the sub-master file. As a result, sub-master storage devices provide parallel file dissipation, rather than merely serial dissipation (i.e., dissipation of files from only one source, namely the master storage device).

It should be also pointed out that each storage device could be a master storage device for a first file, a slave storage device for a second file, a sub-master for a third file or any other possible combinations when there exists numerous files in the network. These storage device categories are not mutually exclusive. Thus, it should not be considered that being one type of storage device for one file precludes the storage device from being another type for a second file.

Figure 2B:
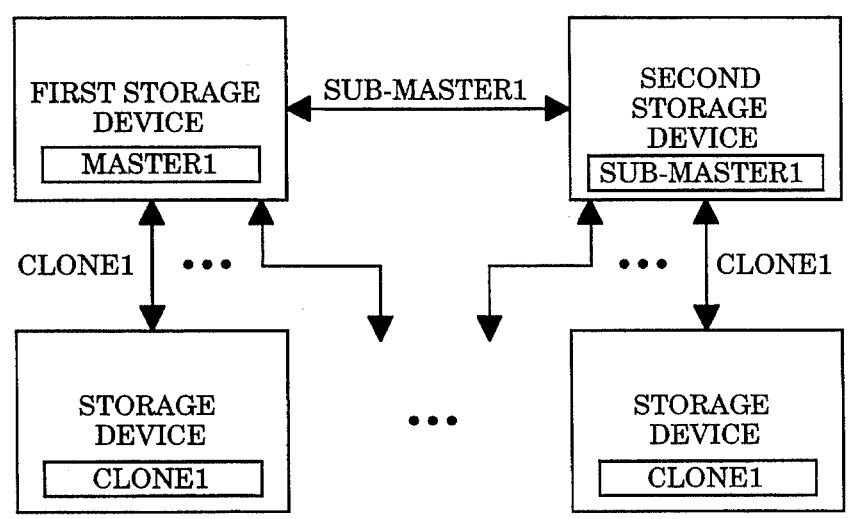
FIG. 2b is a specific example of a network system configuration.

A specific example of a configuration of a network incorporating the present invention is illustrated in FIG. 2b. The example is for the sole purpose of illustrating the operation of the present invention, and is in no way a limitation on the scope of the present invention. The network in this example comprises a plurality of storage devices. A first storage device is configured to store a first master file. A second storage device is configured to store a sub-master file of the first master file. As previously stated, the sub-master file is a transferable copy of the first master file. The remaining plurality of storage devices are configured to receive and store a copy of either the master file from the first storage device or a copy of the sub-master file from the second storage device (hereinafter referred to as a "first clone file"). In view of the above example, these remaining plurality of storage deices make intermittent file status and file send requests to its file provider (e.g., the first device or the second device to update their respective first clone file.

Figure 3A:
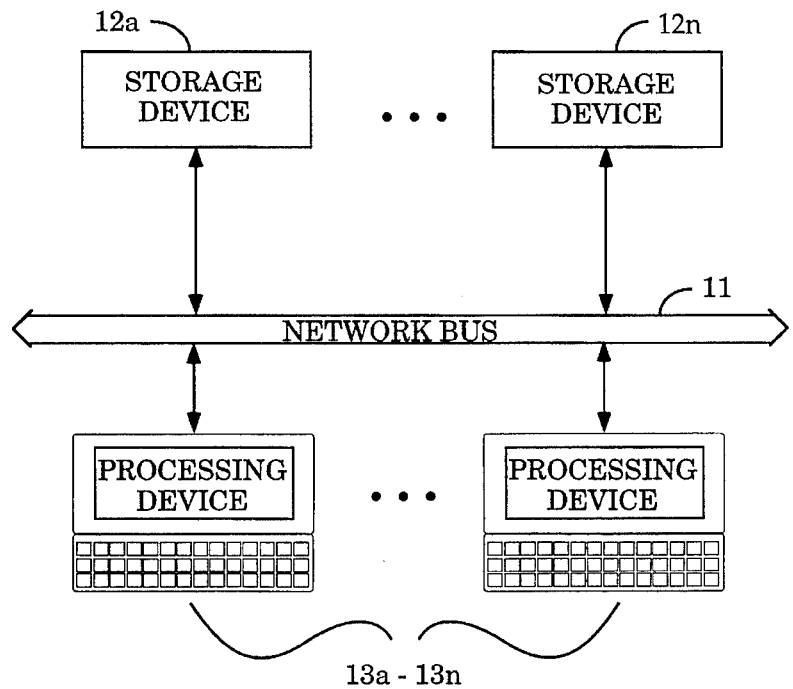
FIG. 3a is a block diagram of a conventional network coupling a plurality of storage devices with a plurality of conventional workstations.

In FIG. 3a, a conventional network system is illustrated. The conventional network system comprises a plurality of storage devices 12a–12n, which are hardware devices capable of storing a large number of files. The plurality of storage devices 12a–12n include, but are not limited to, file servers. The storage devices 12a–12n are coupled to at least one, but preferably a plurality of processing devices 13a–13n, workstations for example, through the conventional network bus 11. The conventional network bus 11 interconnects the storage devices 12a–12n, the processing devices 13a–13n and any other devices networked together in order to provide each of the plurality of processing devices 13a–13n potential access to each of the plurality of storage devices 12a–12n. Such access is a design choice and not determined by simply connecting devices to the same network bus 11.

Figure 3B:
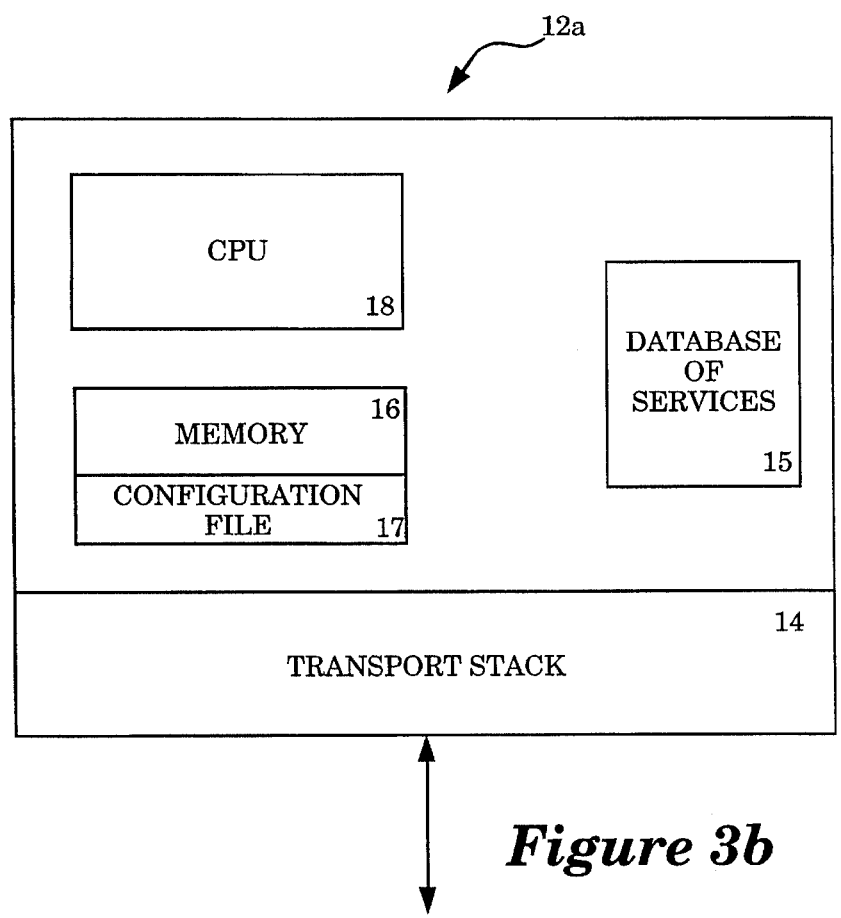
FIG. 3b is a detailed representation of a storage device as a file server.

Referring now to FIG. 3b, it illustrates one of the plurality of the storage device 12a in greater detail, although each of the plurality of the storage devices 12a–12n contain identical components and operate in a substantially similar manner. For clarity sake, the following description shall concentrate on a first storage device 12a working in cooperation with the remaining plurality of storage devices, where "n" is an arbitrary number greater than one.

The first storage device 12a comprises a transport stack 14 coupled to the network bus 11, a database of services 15 and internal memory 16 for storing information therein, including but not limited to, a configuration file 17. These elements are controlled by a central processing unit ("CPU") 18. The transport stack 14 is a connector used to create, maintain and terminate connections between networked devices. Such connectors include, inter alia, an Inter-network Packet Exchange ("IPX") network transport which follows Novell™ standard protocol.

The database of services 15 is a collection of memory used to store information pertaining to every networked storage device 12a–12n, (e.g., the "Bindery" as referred to in Novell™ NetWare). This information includes a storage device name and its associated network address for each networked storage device that can potentially provide a master file, normally every storage device. The database of services 15 is coupled to the network bus 11 through the transport stack 14.

Referenced above, the memory 16 stores information in a file format. This file format contains file status information and data. The file status information is used to determine whether the file needs to be propagated from a master storage device to a slave (or sub-master) storage device. Such file status information includes a plurality of file characteristics including, but not limited to, a file name; file date; file ownership; and file attributes, such as read only, sharable, hidden, purged, etc. These file characteristics are used for comparison purposes to determine whether the clone file needs to be updated.

The configuration file 17 is a file containing device characteristics pertaining to the storage device 12a (i.e., whether the storage device 12a can send files, receives files, etc.). Prior to each operation, the storage device 12a reads its configuration file 17 to ascertain whether it is permitted to function accordingly. More specifically, the configuration file 17 comprises two lists: (i) a sending list and (ii) a receiving list.

The sending list is basically a list of master files supported by the storage device 12a. An entry in the sending list includes a filename of a specific master file, a memory location of that master file, and changeable file entry to enable the file attributes to be altered from the master file's file attributes. The receiving list is a list of clone files maintained by the storage device 12a. Each entry of the receiving list includes a filename of a specific clone file, a memory location used to store the clone file and the name of the master storage device.

As previously alluded to in the above-discussion, the purpose of the present invention is to devise a communication scheme for continuously propagating a master file from one storage device to another through a pre-existing conventional network bus. The result being a network enhanced communications between users. In the present invention, the storage devices 12a–12n are capable of performing three network operations; namely, (i) obtaining file status information and an updated clone file, a most recent copy of the master file, from a master storage device; (ii) servicing file status requests and file send requests from a slave storage device; and (iii) sending clone files and its associated file characteristics to requesting storage devices. Thus, the present invention provides a multi-threaded communication scheme to support the above-identified functions.

Figure 4:
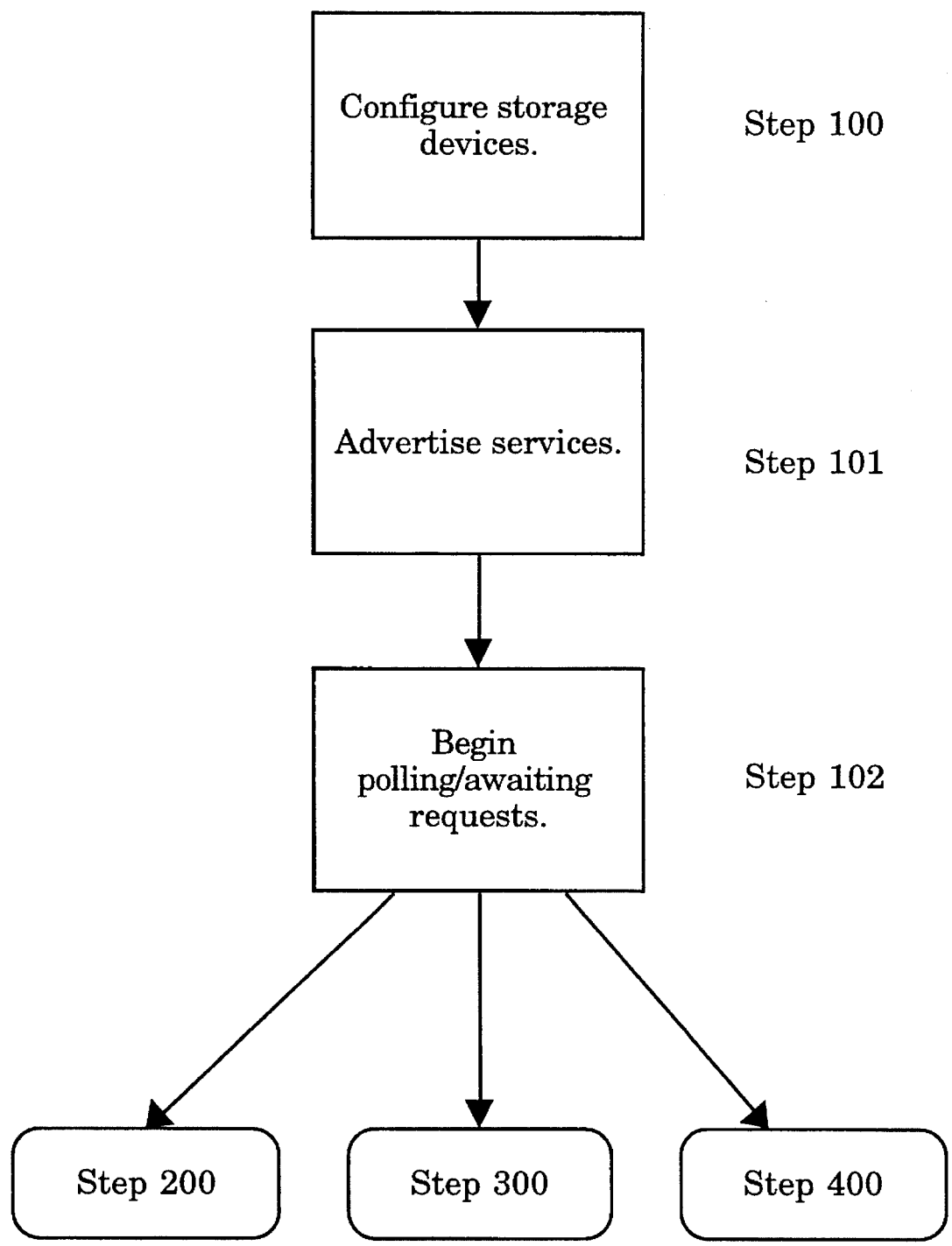
FIG. 4 is a flow chart for the process for enabling file propagation between storage devices over a conventional network bus.

Referring now to FIG. 4, it illustrates the general process undertaken by one of the plurality of storage devices in order to continuously propagate master files over a network. This process applies to each of the storage devices in order to achieve complete interaction of every networked storage device. The process is performed by software and firmware control in the storage device, but may be controlled by hardware.

Figure 6:
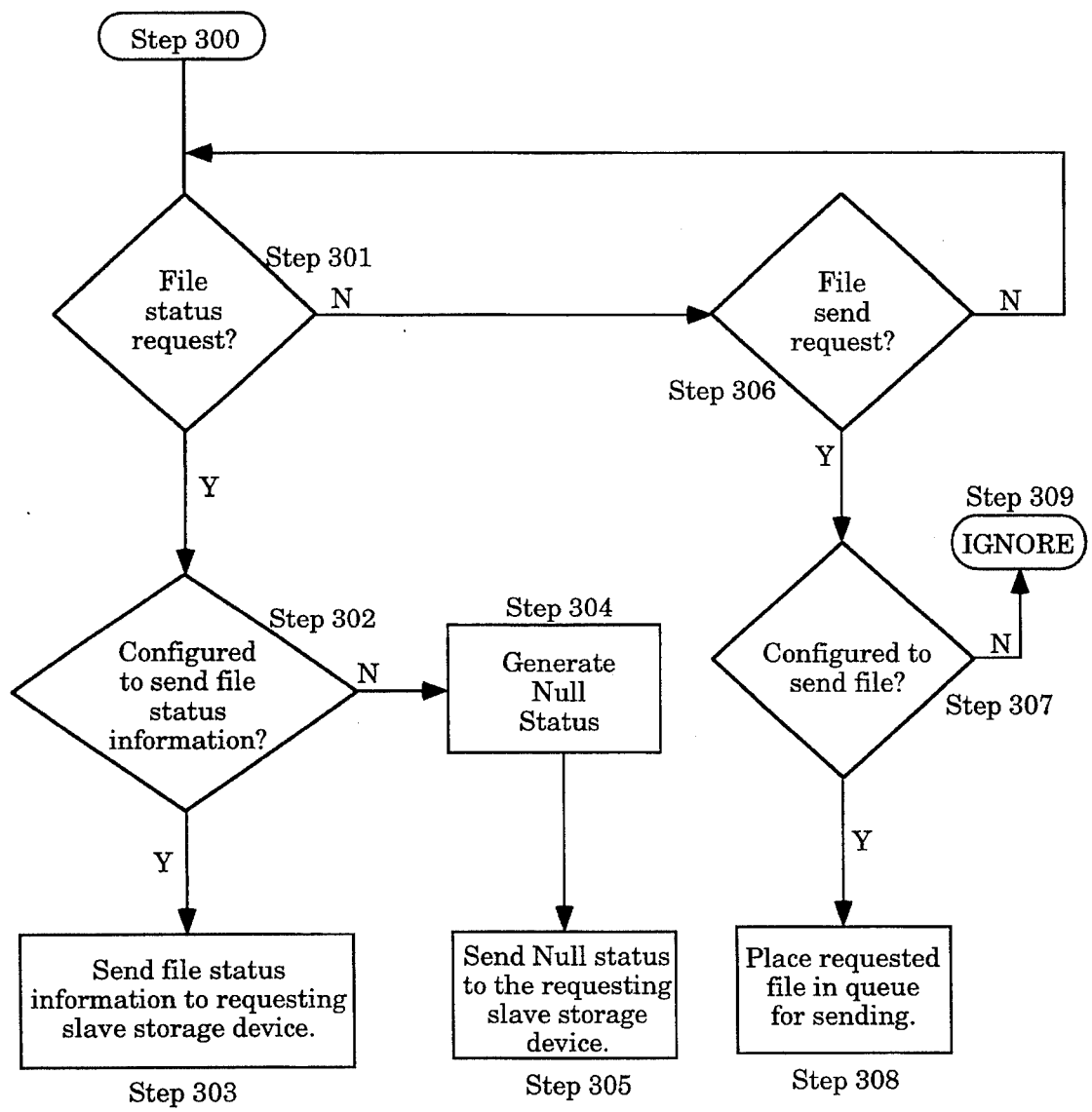
FIG. 6 is a flow chart of the process for responding to a file status request and a file send request by any master storage device.
Figure 7:
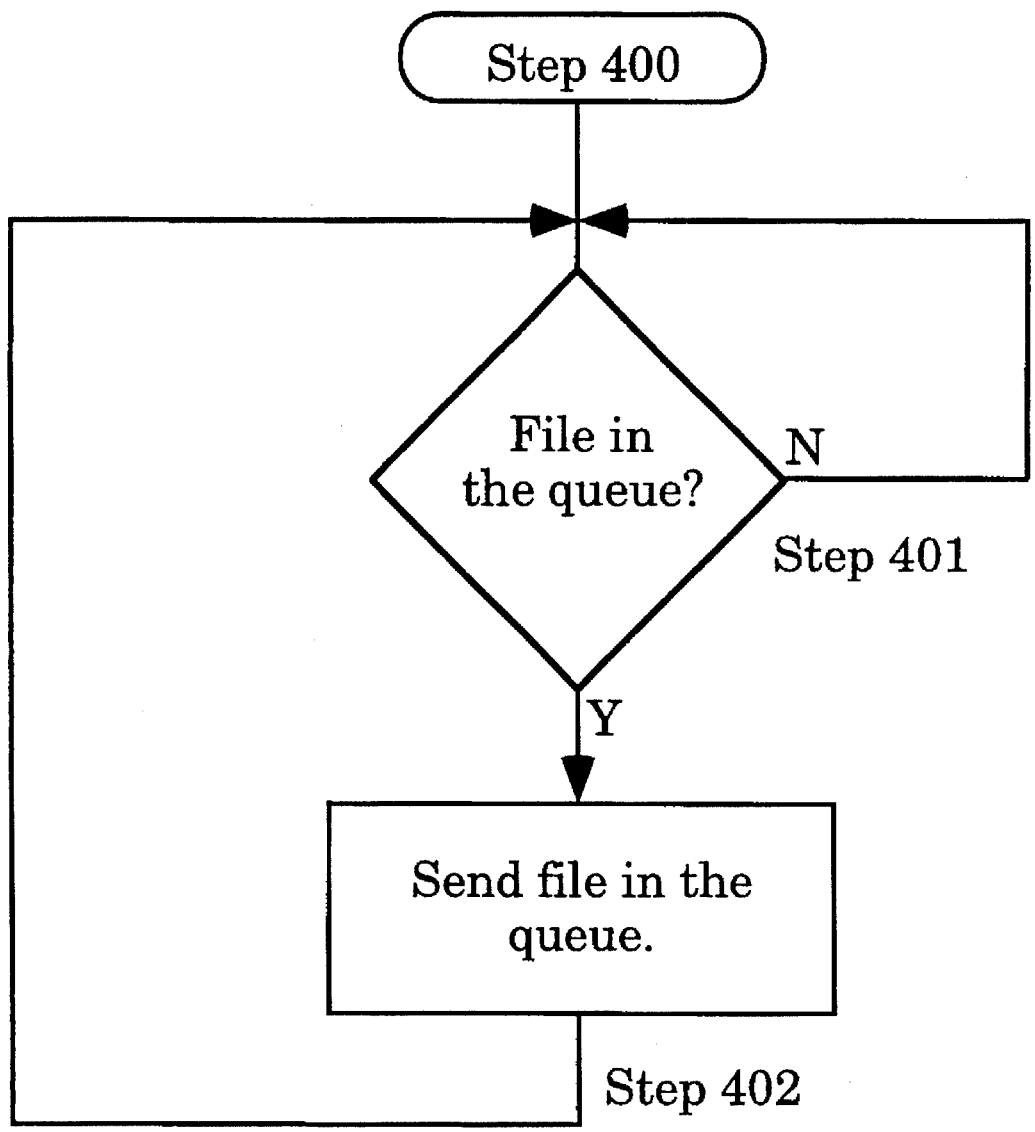
FIG. 7 is a flow chart of the process for sending an updated clone file to a requesting slave storage device.

In step 100, a first storage device is arbitrarily configured to store a preselected number of master files and/or to be able to receive and store a selected number of clone files. This is accomplished by setting up the configuration file(s). Next, the first storage device propagates packets of information over the network bus 11 to identify that it is a potential "source" of the master or sub-master file in accordance with Service Advertising Protocol ("SAP") (Step 101). Such information includes, but is not limited to, the network address of the first storage device. This propagation of packets of information is commonly referred to as file storage device "advertising" its services. Thereafter, in step 102, the first storage device continues to operate according to a polling scheme and/or awaits requests from other storage devices as illustrated in steps 200, 300 and 400 as shown in FIGS. 5–7 respectively.

Figure 5:
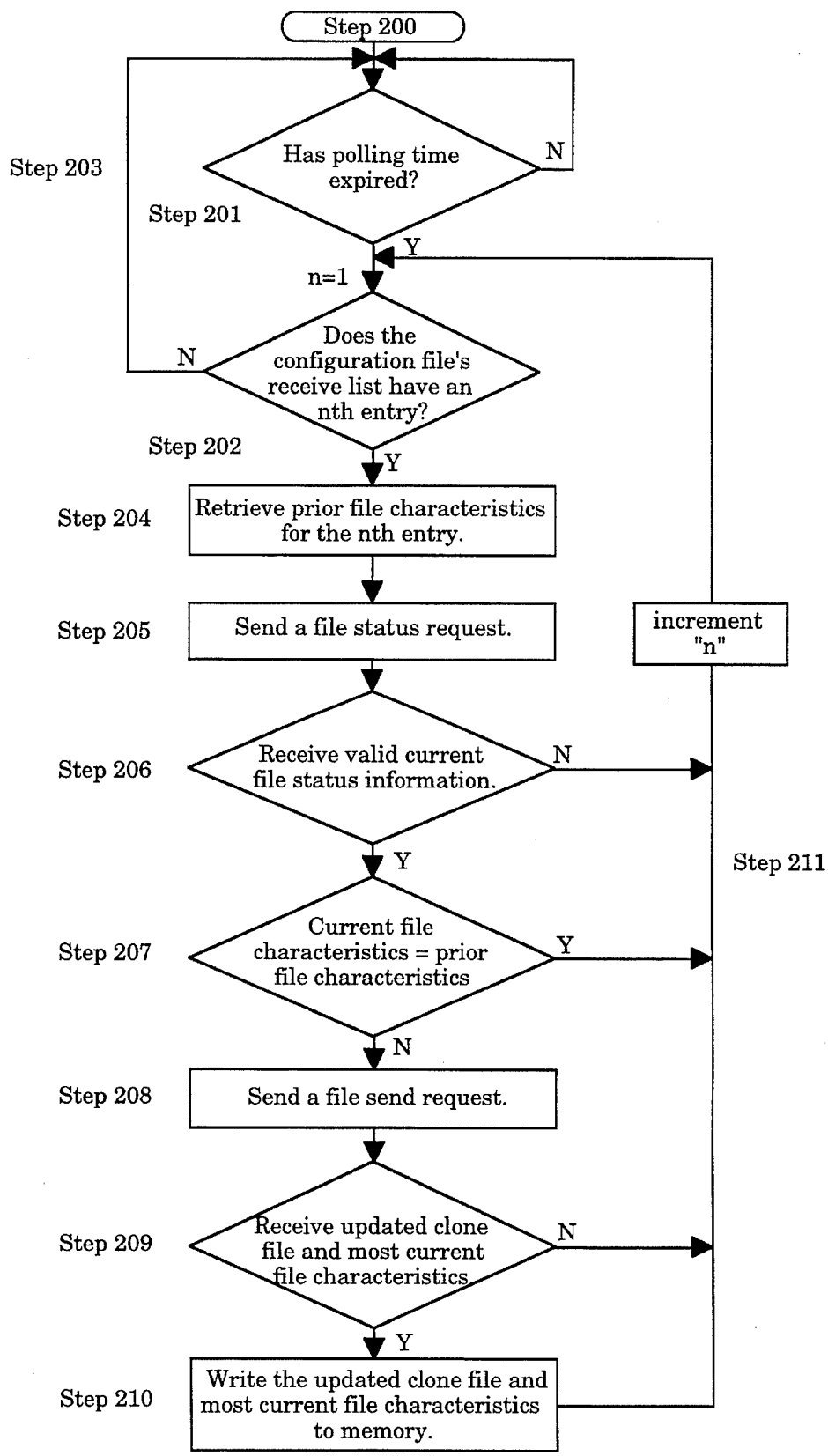
FIG. 5 is a flow chart of the process for obtaining master file status information and an updated clone file.

In FIG. 5, the first network operation (i.e., obtaining file status information and updating its clone(s) file), acts according to a polling scheme in which the following operation is commenced after expiration of a predetermined time period (step 201). The duration of the predetermined time period is a design choice and thus, is arbitrarily chosen and could be adjustable so that certain clone files are checked for updating more frequently than others. However, it is contemplated that the network could function based on a request-type mechanism.

In step 202, after the process has been polling for the predetermined time period, the configuration file, namely a first entry in the receiving list, is read to determine if the first storage device is maintaining any clone files. If not, the polling scheme is re-initialized (step 203). If the receiving list contains a clone file, the first storage device retrieves prior file characteristics of the clone file (step 204). As shown in step 205, the first storage device then sends a file status request to a master storage device of that clone file, requesting current file status information pertaining to the master file from the storage device.

Upon receipt of valid current file status information (step 206), the first storage device compares the file characteristics within the current file status information (i.e., the "current file characteristics") with file characteristics within its prior file status information ("prior file characteristics") (step 207). If these characteristics are equivalent, then there is no need for the first storage device to be updated, and if applicable, the first storage device continues by re-checking the receiving list for a second clone file (step 211) and whether the first storage device is configured to receive status information from the storage device storing the second master file.

If, on the other hand, the current file characteristics differs from the prior file characteristics, which indicates that the first clone needs to be updated, the first storage device sends a file send request to the master storage device (step 208). The master storage device prepares the updated clone file and sends the updated clone file, along with its most current file characteristics, to the first storage device (step 209). The updated clone file is written into memory along with the most current file characteristic (step 210). This process continues until each of the clone files stored in the first storage device have been checked.

Additionally, in the second network operation shown in FIG. 6, the first storage device awaits a file status request, or alternatively, a file send request from another storage device e.g., a second storage device (step 301). Upon receipt of the file status request from the second storage device, the first storage device reads its sending list to verify that it is configured to send the requested file status information since certain files and information pertaining thereto may be precluded from being sent due to an imposed protection mechanism (step 302). If so, the first storage device obtains the requested file status information and places it on the network, the requested file status information being addressed for the second storage device (step 303). However, if the request file status information is not configured to be sent by the first storage device, the first storage device generates a null status, which is a file status filled with zeros (step 304). The null status is sent to the slave storage device (i.e., the second storage device) indicating that it has made an invalid status request (step 305).

In the event that a file request is received from the slave storage device (step 306), the first storage device verifies that the requested file is configured to be sent to other storage devices (step 307). If so, the requested file is placed in a queue within the first storage device, preferably a FIFO queue, to be sent to the slave storage devices when the first storage device is free (step 308). If, on the other hand, the requested file is not configured to be sent, the file request is ignored (step 309). Since the storage device is preferably designed to disable a file status request or file send request if not serviced within a certain period of time, there is no threat to operation disruption.

With respect to the third operation, the first storage device intermittently reads the file queue (step 401). If the first storage device locates a file in the file queue, it sends the requested file through the network bus to the slave storage device (step 402).

The present invention described herein may be designed in many different methods. While the present invention is described in terms of a particular method, it is evident that numerous alternatives, depictions, variations and uses will be apparent to those skilled in the art in light of the foregoing description. The invention should, therefore, be measured in terms of the claims which follow.

What I claim is:

1. A method for supporting parallel distribution of a file between a plurality of storage devices coupled to a network bus, the method comprising the steps of:

configuring at least two storage devices of the plurality of storage devices, wherein a first storage device contains a first master file and a second storage device contains a sub-master file, said sub-master file being a copy of said first master file which can be distributed over the network bus;

configuring at least two storage devices of the plurality of storage devices to receive and contain a first clone file, said first clone file of a third storage device of said at least two storage devices is a non-transferable copy of said first master file obtained from said first storage device and said first clone file of a fourth storage device of said at least two storage devices is a non-transferable copy of said sub-master file based on said first master file;

advertising over the network bus that the plurality of storage devices are coupled to the network bus;

periodically ascertaining by at least said fourth storage device as to whether said first clone file differs from said sub-master file; and updating said first clone file contained in said fourth storage device by overwriting said first clone file with contents of said first master file after determining that said first clone file differs from said sub-master file contained in said second storage device.

2. The method according to claim 1, wherein the step of updating said first clone file includes the steps of:

requesting by said third storage device that said first storage device containing said first master file propagates a copy of said first master file over the network bus; and propagating said copy of said first master file over the network bus to said third storage device.

3. The method according to claim 2, wherein the step of propagating said first master file includes the step of:

reading a configuration file within said first storage device to ascertain whether said first master file is configured to be propagated over the network bus, wherein
if said first master file is configured to be propagated over the network bus, then
propagating said first master file and its associated file characteristics over the network bus,
retrieving said first master file and said file characteristics from the network bus, and
storing said first master file and said file characteristics within said at least one receiving storage device, and
if said first master file is not configured to be propagated over the network bus, then
ignoring a request by said third storage device to propagate said first master file and said file characteristics over the network bus.

4. The method according to claim 1, wherein the step of periodically ascertaining whether said first clone file differs from said first master file includes the steps of:

retrieving prior file status information contained in said third storage device;

requesting current file status information contained in said first storage device;

outputting said current file status information of said first master file from said first storage device into said third storage device; and comparing said current file status information with the prior file status information contained in said third storage device, wherein the request for said first storage device to propagate said master file is initiated by said third storage device if said current file status information differs from said prior file status information.

5. The method according to claim 4, wherein said prior file status information includes file characteristics of said first clone file stored in said third storage device, said file characteristics include a file name, file date, file ownership and file attributes.

6. The method according to claim 5, wherein said file attributes include read only, sharable, hidden and purged.

7. The method according to claim 4, wherein the outputting step includes the steps of:

reading a configuration file of said first storage device to determine whether said first storage device is configured to propagate said first master file over the network bus, wherein if said first storage device is configured to propagate said first master file over the network bus, then said at least one storage device retrieves said current file status information from memory and sends said current file status information from said first storage device to said third storage device, and if said first storage device is not configured to propagate said first master file over the network bus, then said first storage device propagates a null status over the network bus to said third storage device to indicate that said third storage device made an invalid file status request.

8. A method for supporting parallel distribution of a file between a plurality of storage devices coupled to a network bus, the method comprising the steps of:

configuring a first storage device of the plurality of storage devices to store and send a sub-master file being a transferable copy of a master file contained in another of the plurality of storage devices;

configuring a second storage device of the plurality of storage devices to receive and store a clone file of said sub-master file;

advertising over the network bus that the plurality of storage devices are coupled to the network bus;

periodically retrieving prior file status information regarding said clone file of said second storage device, said prior file status information being stored in said second storage device;

periodically requesting current file status information of said sub-master file stored in said first storage device;

outputting said current file status information of said sub-master file from said first storage device into said second storage device if said first storage device is configured to send said current file status information; and comparing said current file status information with said prior file status information stored in said second storage device, wherein if said current file status information differs from the prior file status information, then requesting the first storage device to propagate said sub-master file over the network bus, and propagating said sub-master file over the network bus for storage within said second storage device, and if said current file status information is identical to said prior file status information, then continuing to periodically request said current file status information stored in said first storage device.

9. In a network of processing devices for executing an application program and a plurality of storage devices which contains files required by the processing devices for execution of the application program, a method for supporting parallel distribution of a file between said plurality of storage devices coupled to a network bus, the method comprising the steps of:

configuring at least one Storage device of the plurality of storage devices to contain a second master file;

configuring at least one sending storage device of the plurality of storage devices to contain and send a first master file and a sub-master file, said sub-master file is a copy of said second master file which can be distributed over the network bus;

configuring at least one receiving storage device of the plurality of storage devices to receive and contain a first clone file and a second clone file, said first clone file and said second clone file are non-transferable copies of said first master file and said sub-master file, respectively;

advertising over the network bus that said at least one sending storage device and said at least one receiving storage device are coupled to the network bus;

periodically ascertaining by said at least one receiving storage device as to whether said first clone file differs from said first master file and whether said second clone file differs from said sub-master file;

updating said first clone file by said at least one sending storage device to produce an updated clone file after determining that said first clone file differs from said first master file contained in said at least one sending storage device; and updating said second clone file with said sub-master file after determining that said second clone file differs from said sub-master file.

10. The method according to claim 9, wherein the step of updating said first clone file includes the steps of:

requesting said at least one receiving storage device that said at least one sending storage device propagates the first master file over the network bus; and propagating the first master file over the network bus to said at least one receiving storage device.

11. The method according to claim 10, wherein the step of propagating said first master file contained in the first storage device includes the step of:

reading a configuration file within said at least one sending storage device to ascertain whether said first master file is configured to be propagated over the network bus, wherein if said first master file is configured to be propagated over the network bus, then propagating said first master file and its associated file characteristics over the network bus, retrieving said first master file and said file characteristics from the network bus, and storing said first master file and said file characteristics as an updated clone file being the most current version of the first clone file within said at least one receiving storage device, and if said first master file is not configured to be propagated over the network bus, then ignoring a request by said at least one receiving storage device to propagate said first master file and said file characteristics over the network bus.

12. The method according to claim 9, wherein the step of periodically ascertaining whether said first clone file differs from said first master file includes the steps of:

retrieving prior file status information contained in said at least one receiving storage device;

requesting current file status information contained in said at least one sending storage device;

outputting said current file status information of the first master file from said at least one sending storage device into said at least one receiving storage device; and comparing said current file status information with the prior file status information contained in said at least one receiving storage device, wherein the request for said at least one sending storage device to propagate said first master file is initiated by said at least one receiving storage device if said current file status information differs from said prior file status information.

13. The method according to claim 12, wherein said prior file status information includes file characteristics of said first clone file stored in said at least one receiving storage device, said file characteristics include a file name, file date, file ownership and file attributes.

14. The method according to claim 13, wherein said file attributes include read only, sharable, hidden and purged.

15. The method according to claim 12, wherein the outputting step includes the steps of:

reading a configuration file of said at least one sending storage device to determine whether said at least one sending device storage device is configured to propagate said first master file over the network bus, wherein if said at least one sending device storage device is configured to propagate said first master file over the network bus, then said at least one sending device storage device retrieves said current file status information from memory and sends said current file status information to said at least one receiving device storage device, and if said at least one sending device storage device is not configured to propagate said first master file over the network bus, then said at least one sending device storage device propagates a null status over the network bus to said at least one receiving device storage device to indicate that said at least one receiving device storage device made an invalid file status request.

16. The method according to claim 9, wherein said at least one sending storage device includes a first sending storage device containing said first master file and a second sending storage device containing said sub-master file.

17. The method according to claim 9, wherein at least one receiving storage device includes first receiving storage device containing said first clone file and a second receiving storage device containing said second clone file.

18. In a network of processing devices that execute application programs and storage devices that contain files required by the processing devices to execute the application programs, a method for supporting parallel distribution of a file between a plurality of storage devices coupled to a network bus, the method comprising the steps of:

configuring a first storage device of the plurality of storage devices to contain and send a sub-master file being a transferable copy of a master file contained in one of the plurality of storage devices;

configuring a second storage device of the plurality of storage devices to receive and contain a clone file being a copy of said sub-master file;

advertising over the network bus that the plurality of storage devices are coupled to the network bus;

periodically retrieving prior file status information regarding said clone file from the second storage device, said prior file status information including a file date and file attributes of said clone file;

periodically requesting current file status information stored in said first storage device, said current file status information including a file data and file attributes of said sub-master file;

outputting said current file status information of said sub-master file from said first storage device into said second storage device if the first storage device is configured to send said current file status information; and comparing said current file status information with said prior file status information stored in said second storage device, wherein if said current file status information differs from the prior file status information, then requesting said first storage device to propagate said sub-master file over the network bus, and propagating said sub-master file over the network bus to said second storage device to be contained as an updated clone file, and if said current file status information is identical to said prior file status information, then continuing to periodically request said current file status information contained in said first storage device.

* * * * *

UNITED STATES PATENT AND TRADEMARK OFFICE
CERTIFICATE OF CORRECTION

PATENT NO. : 5,546,539
DATED : August 13, 1996
INVENTOR(S) : William F. Poling It is certified that error appears in the above-identified patent and that said Letters Patent is hereby corrected as shown below:

Column 1, line 4 and
On the Title Page at [54] delete "NEWORK" and insert --NETWORK--

Column 1, line 3 and
On the Title Page at [54] delete "PROPOGATION" and insert --PROPAGATION--

In column 10 at line 8 delete "Storage" and insert --storage--

Signed and Sealed this

Sixth Day of May, 1997

*Attest:*

BRUCE LEHMAN

*Attesting Officer*   Commissioner of Patents and Trademarks